United States Patent

Choi et al.

[11] Patent Number: 5,770,998
[45] Date of Patent: Jun. 23, 1998

[54] DEVICE AND CONTROLLING METHOD FOR DISPLAYING STATIONARY/DYNAMIC STATUS OF CAR

[76] Inventors: Jae-Hwan Choi, 2042 Hwanghak-Dong, Chung-ku; Ho-Sik Choi, 144-487, Pukkajwa 1-dong, Sodeamun-ku, both of Seoul, Rep. of Korea

[21] Appl. No.: 764,118

[22] Filed: Dec. 9, 1996

[30] Foreign Application Priority Data

Dec. 11, 1995 [KR] Rep. of Korea ................. 48264/1995

[51] Int. Cl.$^6$ ..................................................... B60Q 1/00
[52] U.S. Cl. ......................... 340/463; 340/464; 340/466; 340/467; 340/479; 307/10.8
[58] Field of Search ..................................... 340/463, 464, 340/466, 467, 468, 479; 364/423.098; 307/10.8

[56] References Cited

U.S. PATENT DOCUMENTS

| | | | |
|---|---|---|---|
| 4,357,594 | 11/1982 | Ehrlich et al. | 340/467 |
| 4,556,862 | 12/1985 | Meinershagen | 340/479 |
| 4,894,641 | 1/1990 | Yang | 340/466 |
| 5,148,147 | 9/1992 | Kobres | 340/466 |
| 5,231,373 | 7/1993 | Freeman et al. | 340/467 |

*Primary Examiner*—Edward Lefkowitz
*Attorney, Agent, or Firm*—Jacobson, Price, Holman & Stern, PLLC

[57] ABSTRACT

Device for displaying stationary/dynamic status of a car for assuring safety including a car stationary/dynamic state sensing part for detecting a change of speed of a predetermined time period sensed by a rotating slit plate mounted on a speed meter cable connecting device and a photo interrupter; a pulse generating part for converting an analog signal from the state sensing part into digital pulses and applying to an microcomputer; the microcomputer for reading in a driving data programmed in a built-in ROM in response to a signal from the pulse generating part and applying driving pulses to a relevant output port; a red LED operating part and a green LED operating part for turning on respective LEDs in a red LED array part and a green LED array part in response to the microcomputer operation output, thereby running states of car can be expressed in stationary/dynamic states of stop, slow running, acceleration, equal speed running, deceleration and reversing under the control of a microcomputer.

17 Claims, 14 Drawing Sheets

DEVICE AND CONTROLLING METHOD FOR DISPLAYING STATIONARY/DYNAMIC STATUS OF CAR

BACKGROUND OF THE INVENTION

1. Field of the Invention

The present invention relates to device and controlling method for displaying stationary/dynamic status of a car and, more particularly, to a device for displaying stationary/dynamic status of a car using an one chip microcomputer, in which a display having a two rowed array of a row of red high luminance light emitting diodes and the other row of green or blue high luminance light emitting diodes (LED) mounted at a predetermined rear part of a car is operated in connection with a speed meter on a gauge board for easy perception of an actual run/stop state of the car in question by a driver in another car in rear of the car in question; and a controlling method thereof.

2. Discussion of the Related Art

Though both the mechanisms and appearances of cars have been improved and modernized keeping pace with the recent continuous development of the car industry, the more and more increased probability of accidents following the gradual popularization of cars has called for a more stringent requirements for safety devices. In general, despite the physical performance involved in car running and the mechanism and safety devices of the car should be developed inter-related to the other, the development of safety devices that can not satisfy the rapid development of the mechanical system and performances of the cars has caused car drivers to have a keen requirement for safety.

In the meantime, the repetitive or irregular physical motion of acceleration, regular running, and deceleration of a running car body leads a car driver to depend on a limited angle of vision in substantial portion of his driving. And, though it would be helpful if the safety devices that indicate running states of the car outwardly would inform a sudden accident that could be happened in any time depending on a road condition or a natural condition in the environment to a driver in the rear of the car in question to be prepared for the accident in advance, the current safety devices up to now can not get out of braking dependent on a brake pedal.

Though it seems that, when a driver steps on a brake pedal, braking lamps are turned on, and, accordingly, a driver in a car in rear of the car in question slows down his car, the driver in rear can not know precisely that with how much force the driver in front has stepped on the brake pedal, and whether the car in front is actually slowing down. Because, under the situation that the road conditions can not be always the same and the mechanical performances of cars are different, if the car drivers conduct the repetitive conditioned reflexive behaviors while watching the uncertain and time limited braking lamps, the braking lamps can not be any great help for the intuitive judgement of ours that is made for the safety of ours. Therefore, if a safety device in a running car can exhibit exact running conditions of the car outwardly, since the drivers or peoples around the running car can use the exhibited running conditions in judging forecastive information for the car running in advance, which allows them to be prepared for it positively in advance with serenity of mind, such a safety device can be a help in minimizing factors and possibilities that threaten safety and in understanding and organic supplement of defects hidden in mechanisms of cars.

There is a known art on a safety device for a running car under this concept, for example, the "DEVICE FOR DISPLAYING SAFETY OF RUNNING STATES OF CAR" disclosed in Korean Patent Publication No. 3615.

The prior art device for displaying safety of running states of a car has one displaying part, in which each of running states of a car is displayed in different colors for indicating a driver in rear of the car in question of a running states of a front car, the displaying device is simplified for varying an external design of the car, a reflecting member is provided on lamp mounting means for minimizing light loss, light focusing means is made not to be exposed to sun light for prevention of discoloring, and an luminance efficiency of the displaying part is improved for clear indication of the running state to the driver in rear, thereby the device has an advantage that it can significantly support to the safe running of traffic.

However, though the prior art device can display all the car running states in different colors exactly, since the device becomes indicative only by an artificial manipulation, such as stepping on a brake pedal, or an acceleration pedal, or a transmission gear change, the device has problems in that the device can not deal with the safety matter appropriately arising from speed change of the car.

SUMMARY OF THE INVENTION

Accordingly, the present invention is directed to device and controlling method for displaying stationary/dynamic status of a car that substantially obviates one or more of the problems due to limitations and disadvantages of the related art.

The object of the present invention is to provide a device for displaying stationary/dynamic status of a car, in which a sensing part which can sense stationary/dynamic states of the car is mounted between a speed meter cable connected to a speed meter on a gauge panel in the car and a driven gear part driven by an output shaft of a transmission gear for driving the cable for displaying a stationary or dynamic state of the car by means of a display device through software basis control of digital pulses detected through the stationary/dynamic state sensing part by an one chip microcomputer having built-in timer and counter; and a method for controlling the same.

Other object of the present invention is to provide a device for displaying stationary/dynamic status of a car, which can sense and exactly display a running speed of the car after 0.2 seconds on a displaying part, and can express stopped or running states of the car classified in 6 operations of stop, slow running, acceleration, equal speed running, deceleration and reversing by sensing the speed and changing a position of a transmission lever to reverse; and a method for controlling the same.

Another object of the present invention is to provide a device for displaying stationary/dynamic status of a car, which is mounted at rear of the car to exhibit a running state of the car to a driver in rear of the car in question in a wave-like LED lighting for elevating elegance of the car without giving any refusive notion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for displaying stationary/ dynamic status of a car including, a car stationary/dynamic state sensing part for detecting a change of speed of a predetermined time period sensed by a rotating slit plate mounted on a speed meter cable connecting device and a photo interrupter, a pulse generating part for converting an analog signal from the state sensing part into digital pulses and applying to an one chip microcomputer, a reverse relay switching part connected to a positive terminal on a reversing lamp for applying an interrupt signal to the one chip microcomputer when a transmission lever is put to a reversing position, the one chip microcomputer for reading in a driving data programmed in a built-in ROM in response to a signal from the pulse generating part and applying driving pulses to a relevant output port, a power on reset circuit part for applying a reset signal to a reset terminal for initializing the one chip microcomputer, an oscillating part for providing a system clock signal to the one chip microcomputer, a red LED operating part and a green LED operating part for turning on respective LEDs in a red LED array part and a green LED array part in response to the one chip microcomputer operation output, the red LED array part and the green LED array part for being turned on by the operating output from the operating parts, a main switch part for supplying main power to a constant voltage supplying device according to a switching operation, the constant voltage supplying device for supplying a constant voltage to a system according to a main switch operation, and a connecting part for connecting the power supplying part which supplies a car battery power to the main switch part and a reverse lamp voltage reception terminal for operating the reverse relay switching part.

In other aspect of the present invention, there is provided a controlling method for displaying stationary/dynamic status of a car comprising the steps of: (1) initializing an one chip microcomputer to initialize a built-in timer, and a counter upon turning on a switch in the main switch part, stopping the built-in timer and counter in the one chip microcomputer if a pulse generated in a pulse generating part according to an FG pattern of a rotating slit plate in a car stationary/dynamic state sensing part is sensed within 0.2 seconds which is a reference duration of repetitive measurement by the built-in timer in the microcomputer, initializing a time constant of the timer and initializing the built-in counter in the one chip microcomputer if not sensed within the 0.2 seconds, and waiting for an interrupt in an infinitive loop; (2) understanding that the car is at stop or at slow running if a counted value is 0~3 after the stop of the built-in counter in the (1) step, turning on an entire red LED display part and turning off an entire green LED, and subjecting the present counted value "a" which represents a speed of the car at the present time and "c" stored in an internal memory to repetitive (a–c) operation in every 0.2 seconds which is an operation cycle of the built-in timer to calculate a number of pulses at the present time if the counted value is not 0~3; (3) understanding that the car is at an equal speed running if the pulse calculated value is 0 in the (2) step, turning both the entire red LED and the entire green LED off, and jumping to a step for determining the pulse calculated value of being negative or positive if the pulse counted value is not 0; and, (4) understanding that the car is under acceleration if the calculated value is positive in the (3) step, turning the entire red LED off and, on the same time, maintaining the green LED in a turned on state with shifting 12 output terminals on output ports P0'~P7' and Q4'~Q7' to a low level according to a rate of the acceleration, and, understanding that the car is under deceleration if the calculated value is negative in the (3) step, turning the entire green LED off and, on the same time, maintaining the red LED in a turned on state with shifting the 12 output terminals on output ports P0~P7 and Q0~Q3 to a low level according to a rate of the deceleration, thereby the high luminance LEDs in the red, and green LED displaying parts are turned on in a shift on manner with time differences in the right to left directions starting from a first stage in the middle for a duration of each state of stop, slow running, acceleration, equal speed running, deceleration by repetition of the (1)~(4) steps, whereby visual expression of the rates of operation and the duration of each of the states is facilitated.

In another aspect of the present invention, there is provided the controlling method for displaying stationary/dynamic status of a car, further including the steps of, (1) upon reception of an interrupt signal generated by the relay switching part connected to the reverse lamp at reversing of the car, storing the (4) step into the internal memory according to an interrupt priority, flashing the entire red LEDs by maintaining a state in which the entire red LED turned on with putting all the output ports P0~P7 and Q0~Q3 into a low level on the same time and the entire green LED turned off with putting all the output ports P0'~P7' and Q4'~Q7' into a high level for a predetermined time period for a while, and maintaining a state in which the entire red, and green LEDs are turned off with putting the 12 output terminals on the output ports P0~P7 and Q0~Q3 and 12 output terminals on the output ports P0'~P7' and Q4'~Q7' to a high level for a while, and (2) after conducting the (1) step, determining finish of the reversing and repeating the (1) step until finish of the reversing when the operation ends.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
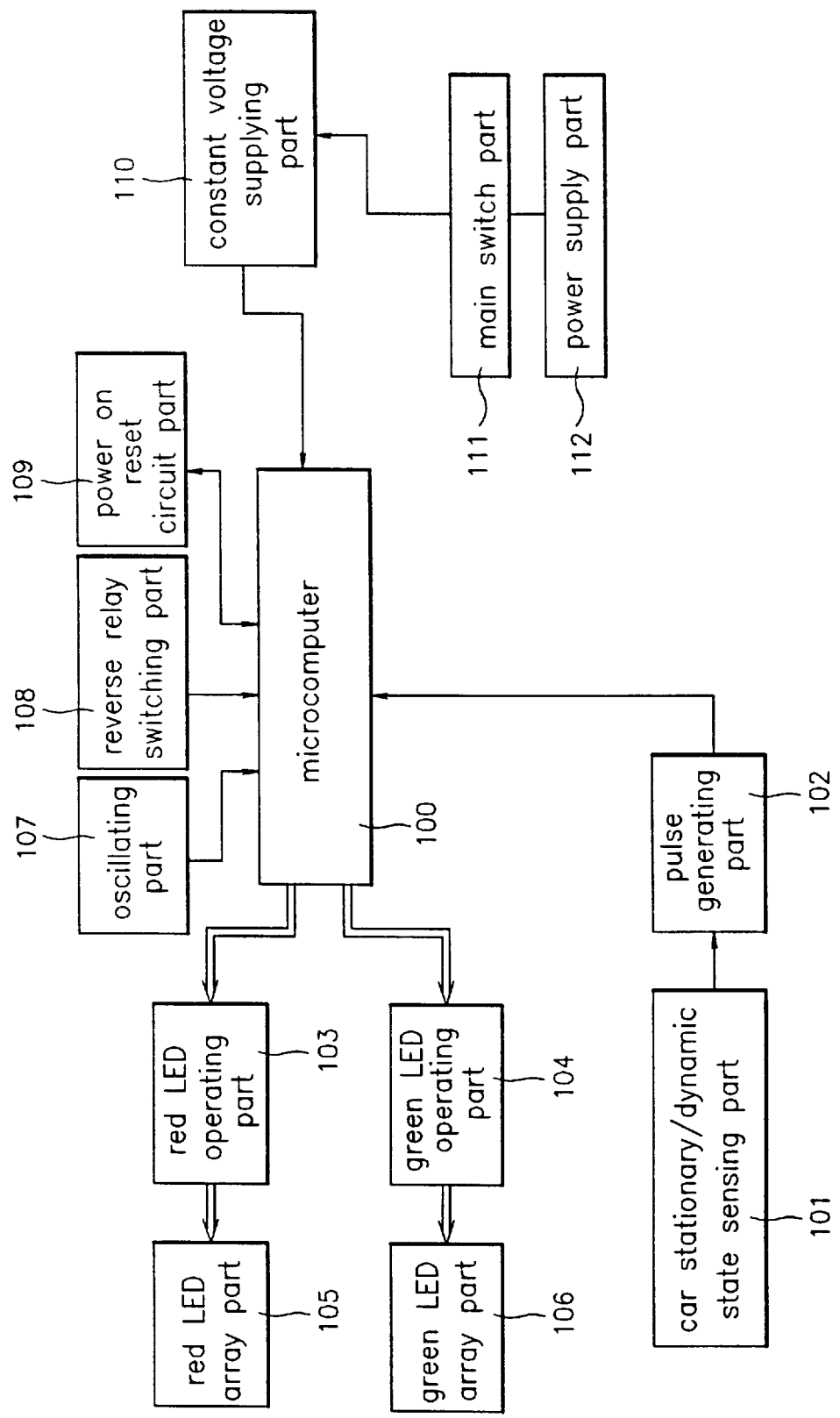
FIG. 1 illustrates a block diagram showing a device for displaying stationary/dynamic status of a car in accordance with a preferred embodiment of the present invention.
Figure 2:
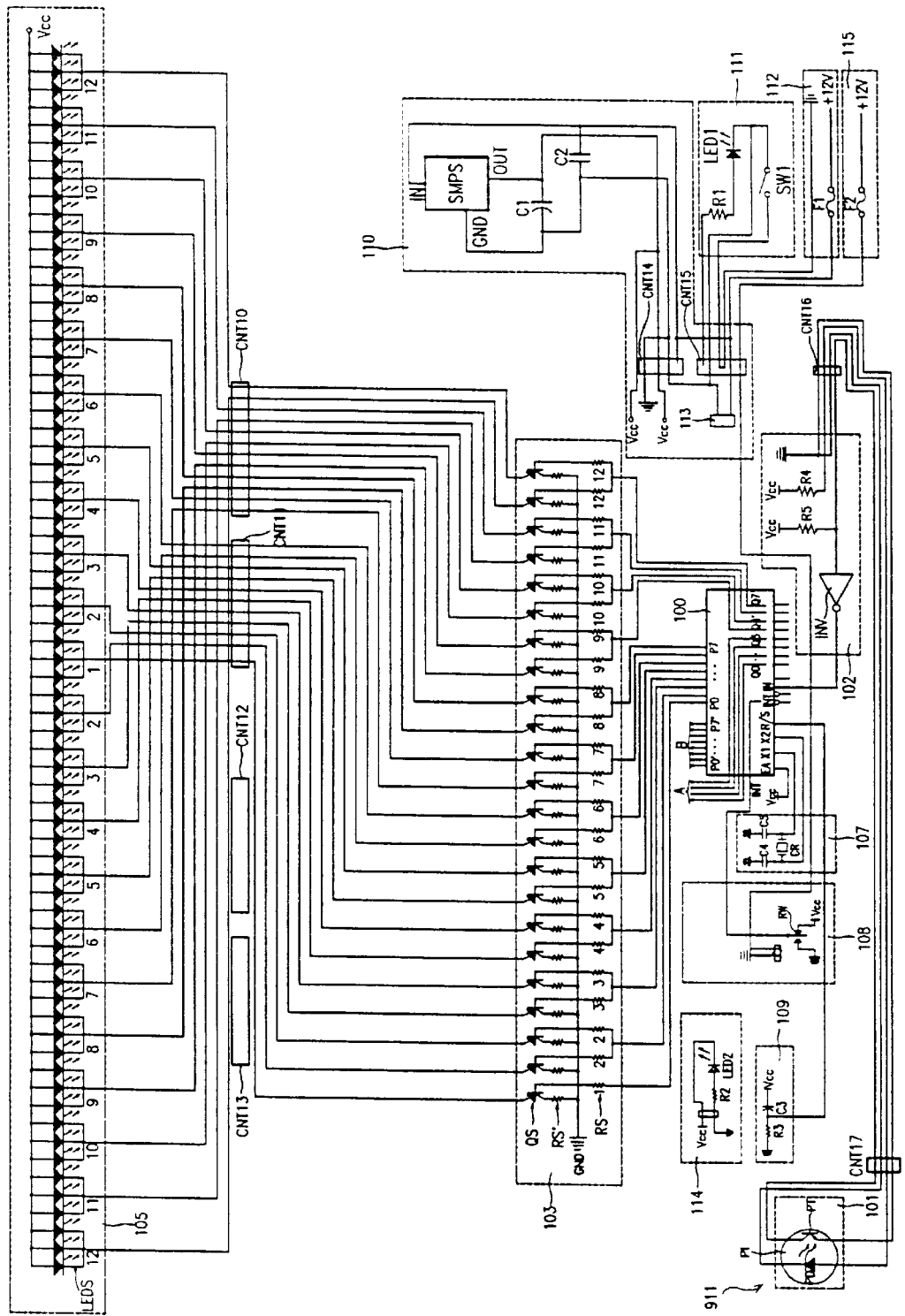
FIG. 2 illustrates a detailed circuit of the device shown in FIG. 1.

FIG. 1 illustrates a block diagram showing a device for displaying stationary/dynamic status of a car in accordance with a preferred embodiment of the present invention, and FIG. 2 illustrates a detailed circuit of the device shown in FIG. 1.

Referring to FIG. 1, the system of the device for displaying stationary/dynamic status of a car in accordance with a preferred embodiment of the present invention will be explained.

A stationary/dynamic state sensing part 101 is connected to an output shaft of a transmission gear which drives a speed meter of the car and a connector for connecting a speed meter cable (including a digital gauge board) for obtaining an analog signal proportional to a running speed of the car.

A pulse generating part 102 includes an inverter INV having the Shmidt trigger function for converting analog pulses sensed by the stationary/dynamic state sensing part 101 into pulses proportional to the running speed and applying to a pulse input terminal IN on an one chip microcomputer 100. The inverter INV is, built-in the system main body, connected to the stationary/dynamic state sensing part 101 of the car, and, is preferably of 74LS14 IC series. And, it is preferable that the one chip microcomputer 100, which reads in an operation data programmed in an internal ROM and applying to a relevant port in response to a control data from the pulse generating part 102, has, for example, a set of the MCS-51 family or a set interchangeable with it.

The one chip microcomputer 100 executes the program stored in the internal ROM based on the pulses generated in and received from the stationary/dynamic state sensing part 101 of the car in response to an interrupt signal from a relay switching part 108 in controlling 24 output terminals for use in displaying stop, slow running, acceleration, equal speed running, deceleration and reversing. The 24 output terminals are grounded in response to a control logic '0', and amplify output currents by means of string resistors Rs and string transistors Qs in red, and green LED operation parts and another string resistors Rs' in controlling 138 high luminance string LEDs in red, and green LED array parts 105 and 106. The pulses measured through the stationary/dynamic state sensing part 101 of the car and a battery DC voltage for a reversing lamp turned on during reversing are applied to the one chip microcomputer 100 for displaying the six stationary/dynamic states of the stop, slow running, acceleration, equal speed running, deceleration and reversing on the red LED array part 105 and the green LED array part 106. The red LED array part 105 and the green LED array part 106 may be considered as the stationary/dynamic state displaying part.

Figure 9:
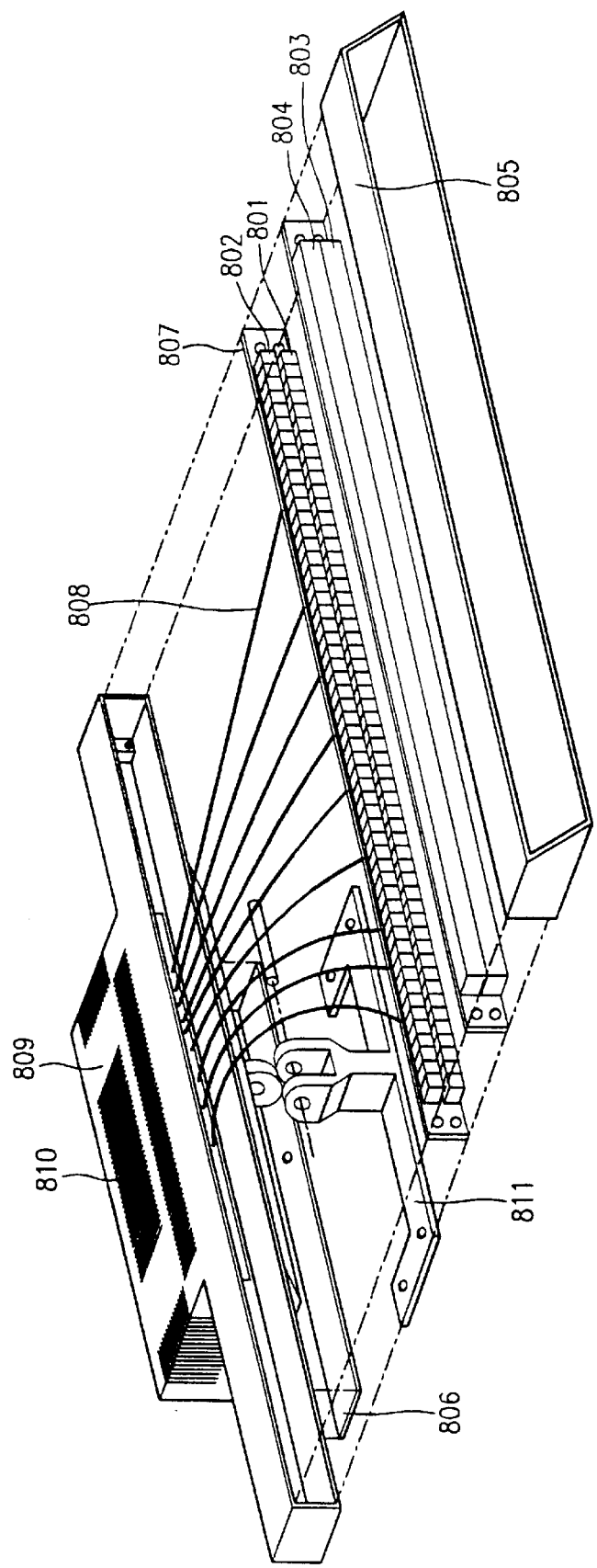
FIG. 9 illustrates a detailed construction of a device for displaying stationary/dynamic status of a car in accordance with a preferred embodiment of the present invention.

The red LED operating part 103, which turns on relevant LEDs in the red LED array part 105 shown in FIGS. 1 and 2 includes the string resistors Rs connected to output ports P0~P7 and Q0~Q3 on the one chip microcomputer 100 respectively, string transistors Qs each connected to a terminal on the string resistor Rs, and another string resistors Rs'. The red LED array part 105, connected to the output terminal on the red LED operating part 103 with connectors CNT 10 and CNT 11, includes a plurality of sets of string LEDs each set having three string LEDs in a row. As shown in FIG. 9, the three red LEDs in a set are connected in parallel, and the sets are arranged in 12 stages of 11 pairs in each of the right and left sides with a pair in the middle as the first stage (total 23 pairs). The green LED array part 106, connected to the output terminal on the green LED operating part 104 with connectors CNT 12 and CNT 13, includes a plurality of sets of string LEDs each set having three string LEDs in a row. As shown in FIG. 9, the three green LEDs in a set are connected in parallel, and the sets are arranged in 12 stages of 11 pairs in each of the right and left sides with a pair in the middle as the first stage (total 23 pairs). The red, and green LED array parts 105 and 106 shown in FIG. 1 included in the red, and green LED displaying parts 801 and 802 shown in FIG. 9 has a long life and easily distinguishable even in daytime because of their high luminance LEDs. The green LED array part 106 may be fabricated, not only with the high luminance LEDs, but also with blue diodes commercially available recently.

An oscillating part 107 providing a system clock signals to the one chip microcomputer 100 shown in FIG. 1 includes a quartz oscillator CR for generating a predetermined reference clock and condensers C4 and C5 each connected to a ground terminal of the quartz oscillator CR.

A reverse relay switching part 108 is directly connected to an interrupt signal reception terminal INT and ground terminal on the one chip microcomputer 100 and a voltage reception terminals Vcc on the reversing lamps.

A power on reset circuit part 109, which produces a reset signal to a reset terminal of the one chip microcomputer 100 for resetting the one chip microcomputer 100 according to a turning on operation of a main switch part SW1, includes a reset circuit having a condenser C3 connected to the voltage supply terminal Vcc and a ground terminal in parallel and a resistor R3.

Figure 14:
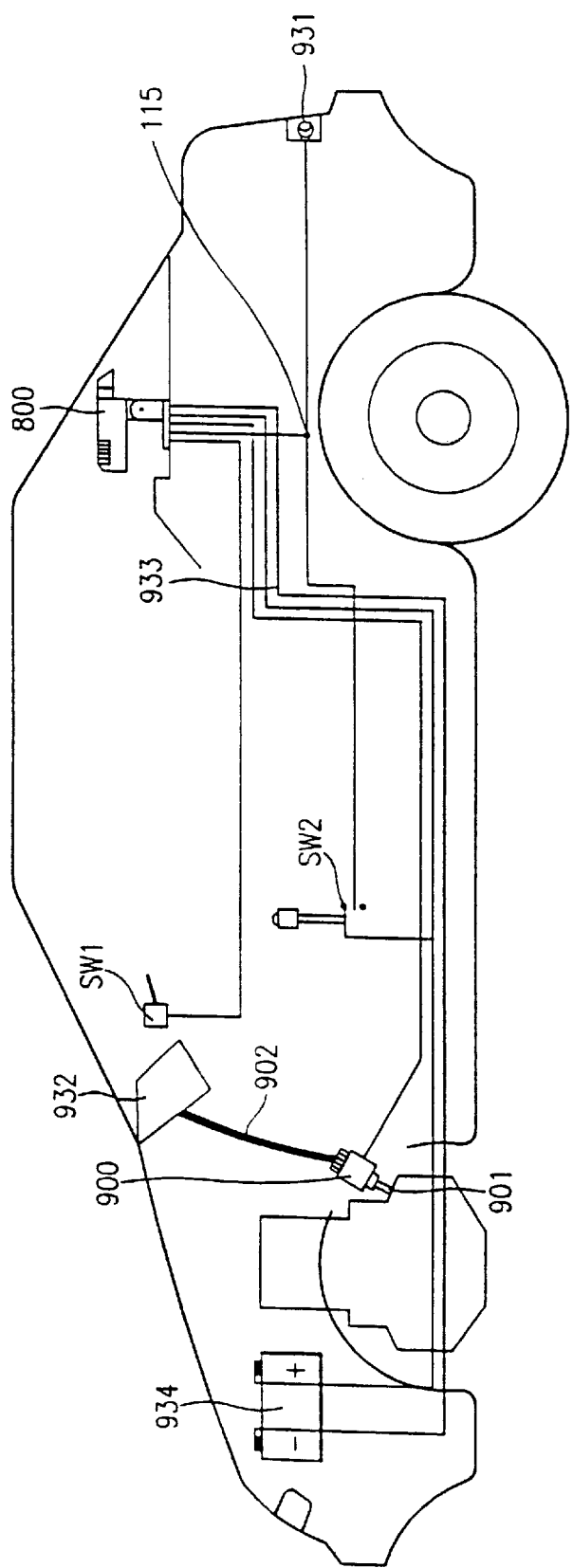

The main switch SW1 in the main switch part 111 for turning on/off the entire red, and green LED displaying parts 801 and 802 is connected to a constant voltage supplying device 110, the one chip microcomputer 100, and a main body 809 shown in FIG. 9 by means of a connector CNT 15 and mounted on a gauge panel 932 in front of the driver seat which is a position that a driver turns on/off the stationary/ dynamic status displaying device 800 with easy (see FIG. 14). The main switch part 111 includes the main switch SW1, and a load resistor R1 and an LED1 connected in series for identification of power supply to, and consequent operation of the displaying device 800.

A DC current for the reversing lamps turned on during reversing of the car is supplied to the main body 809 and the connector CNT 15 shown in FIG. 9 through a fuse F2 for operation of the relay switching part 108 when the reversing lamps are turned on.

A power supplying part 112 connected to a battery of the car is connected to a negative, and positive terminals of the battery 934, is connected to the main body 809 by means of the connector 15 through a fuse F1 for preventing flow of an excessive current at connection to the positive terminal of the battery 934 (see FIG. 14).

As shown in FIG. 9, a heat discharging fan 113 installed in the main body 809 discharges heat generated by operation of the one chip microcomputer 100 and the string transistors Qs to outside.

A system of the stationary/dynamic status displaying device for a car in accordance with a preferred embodiment of the present invention and its actual application to the car will be explained with reference to FIGS. 8~10.

Figure 8:
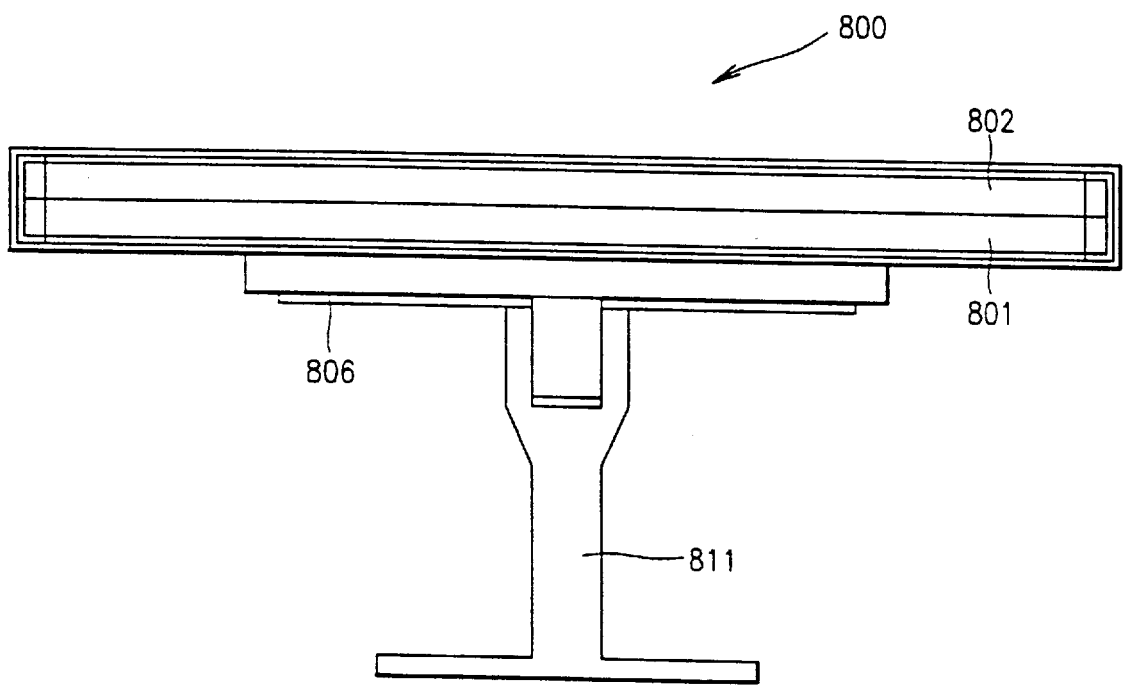
FIG. 8 illustrates a front view of a device for displaying stationary/dynamic status of a car in accordance with a preferred embodiment of the present invention.

Referring to FIG. 8, the stationary/dynamic status displaying device 800 at large includes a main body 809 of the displaying device, the red, and green LED displaying parts 801 and 802 mounted at the front of the main body 809, a support body 811 disposed below the main body 809 for supporting the displaying device 800 in place, and the heat dissipating plate 806 mounted under the main body 809. The heat dissipating plate 806 integrated to the main body discharges the heat generated in the constant voltage supplying device 110 to outside of the main body 809. The constant voltage supplying device 110 has a wide range of supply voltage of maximum 32V and a small required current (maximum 12V, 2A), which will not affect to the battery or charging of the car.

The system of the stationary/dynamic status displaying device will be explained in more detail with reference to FIG. 9.

Each of the red, and green LED displaying parts 801 and 802 in a form of array is packaged to a PCB 807 at the front of the main body 809, a set of wirings is led from rear of the PCB 807, and LED protection covers 803 and 804 are place at the front of the LED displaying parts 801 and 802. The LED protection covers 803 and 804 in a stack of a transparent plastic suitable for irregular reflection, not only protects the LED displaying parts 801 and 802 from being contaminated by dusts and foreign materials which reduces the luminance efficiency thereof, but also make a smooth continuation of a light flow between adjacent LEDs when the high luminance LEDs are turned on.

A light shielding cover 805 covering the outer rim of the LED protection covers 803 and 804 mounted on the PCG 807 is attached to the front of the main body for reducing loss of lights emitted from the red, and green LED displaying parts 801 and 802. Preferably, the light shielding cover 805 is shaped to project from the LED displaying parts 801 and 802 at an appropriate length for protecting the LED displaying parts 801 and 802 from external lights.

The heat dissipating plate 806 of a predetermined shape mounted under the main body 809 is preferably mounted at a position on which a regulator SMPS for regulating a voltage for the constant voltage supplying device 110 shown in FIG. 2. The stationary/dynamic status displaying device 80 may be mounted at rear of different cars as shown in FIG. 10.

Figure 11:
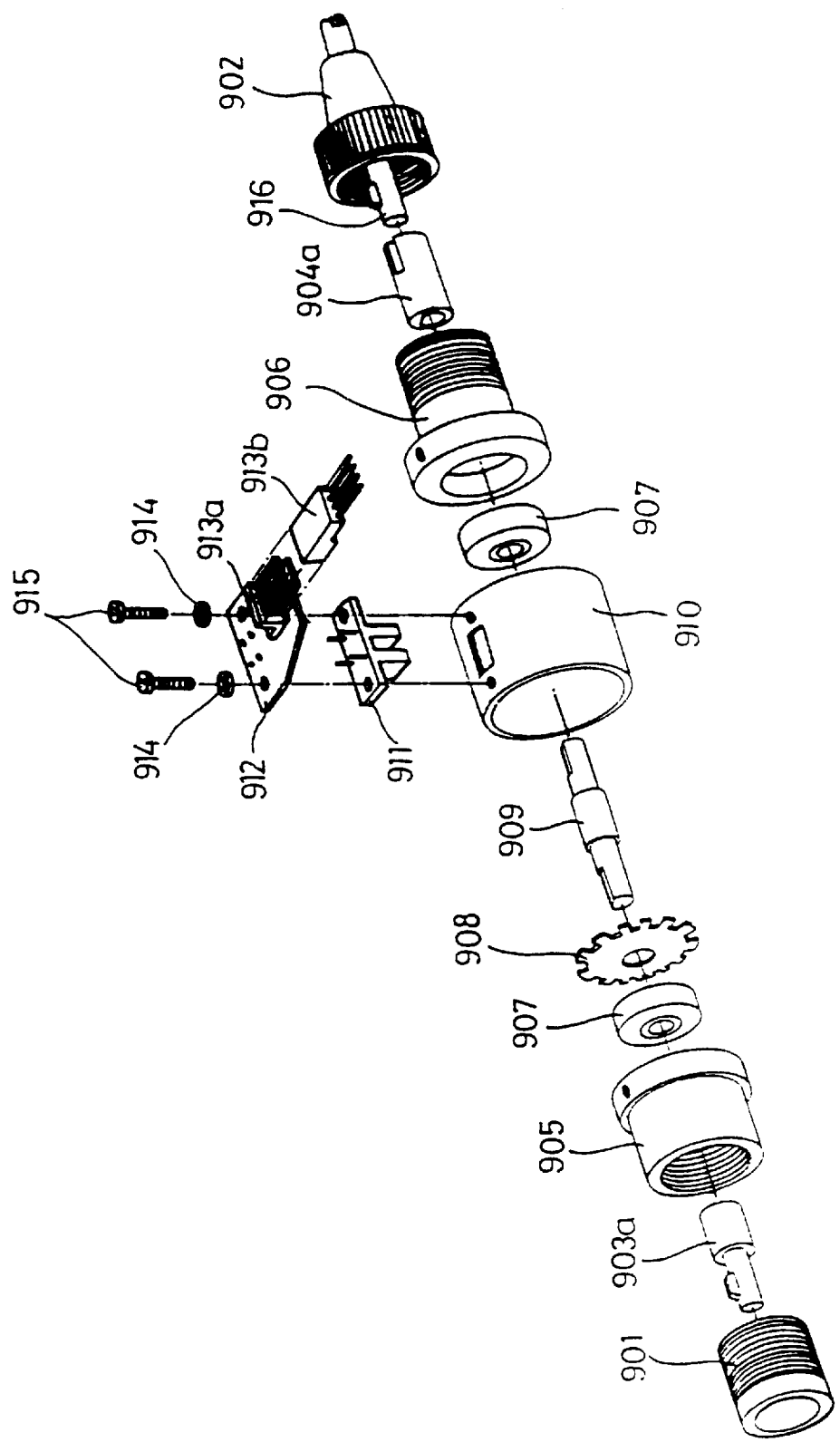
FIG. 11 illustrates a disassembled view showing a mechanical mechanism of one embodiment of a speed meter cable connecting device for sensing stationary/dynamic status of a car in accordance with the present invention.
Figure 12:
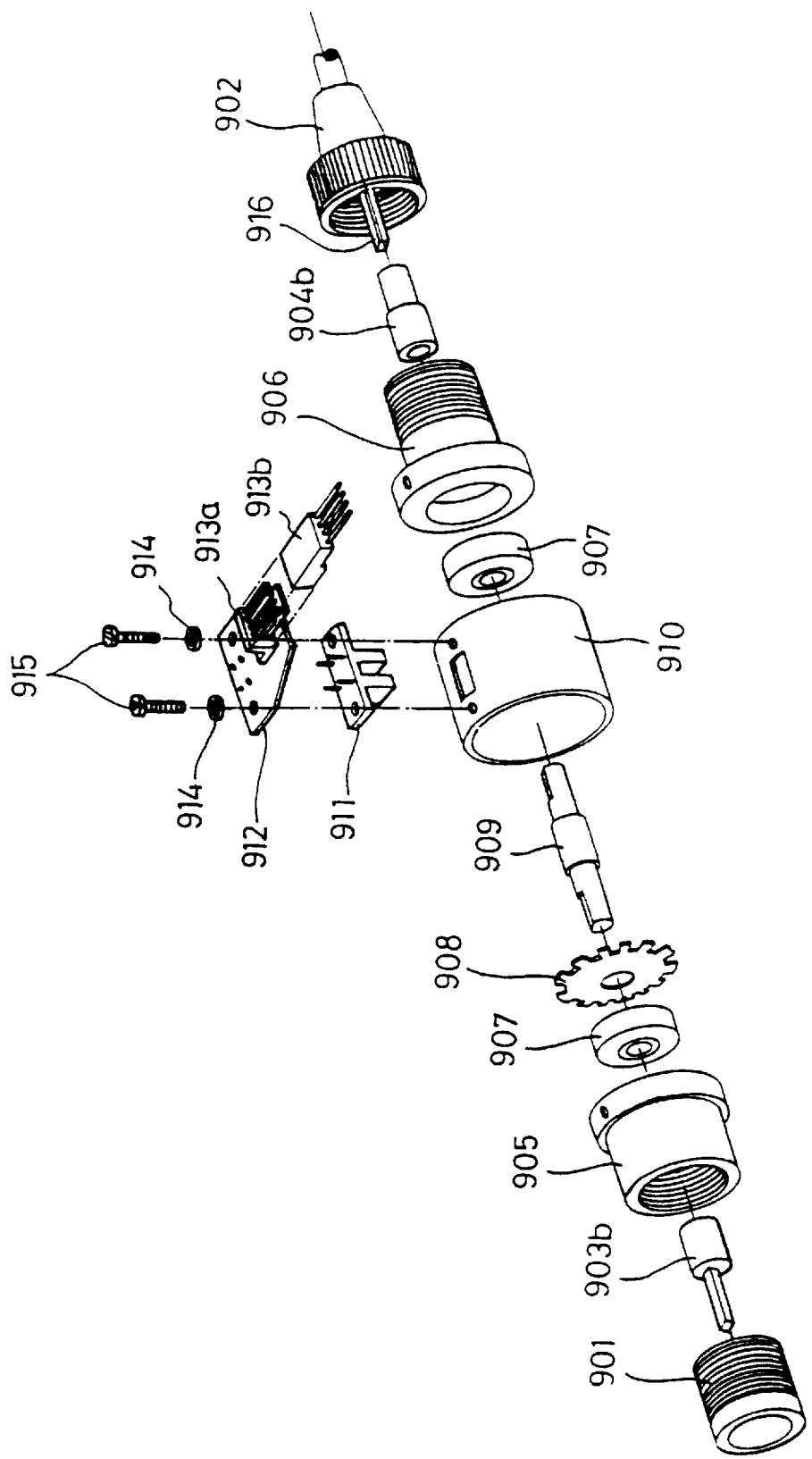
FIG. 12 illustrates a disassembled view showing a mechanical mechanism of another embodiment of a speed meter cable connecting device for sensing stationary/dynamic status of a car in accordance with the present invention.
Figure 13:
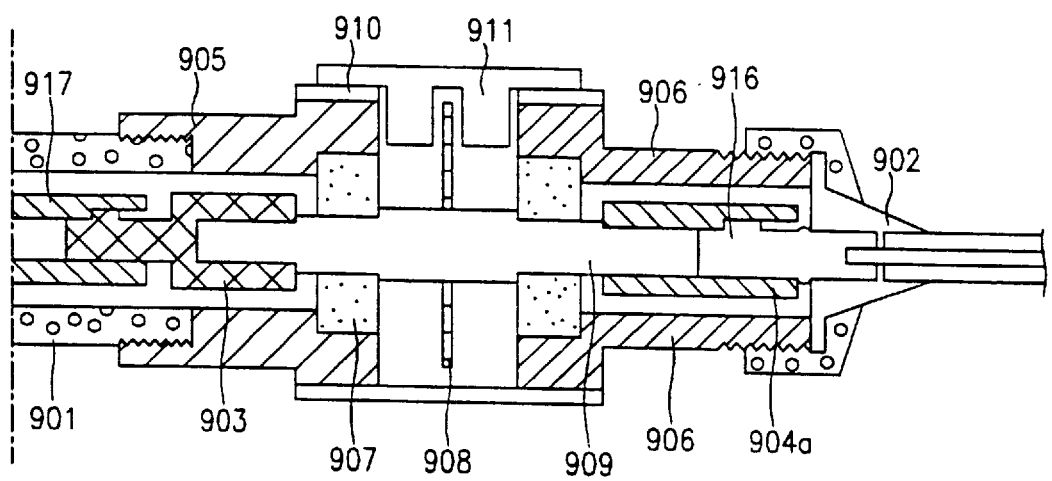
FIG. 13 illustrates an assembled view of the connecting device shown in FIG. 11; and, FIG. 14 illustrates an overall layout of a device for displaying stationary/dynamic status of a car in accordance with a preferred embodiment of the present invention applied to the car.

In the meantime, a mechanical mechanism of the speed meter cable connecting device mentioned in the explanation associated with FIG. 2 applied to the stationary/dynamic state sensing part 101 of the present invention will be explained with reference to FIGS. 11 and 13. FIGS. 11 and 12 illustrate disassembled views each showing a mechanical mechanism of a speed meter cable connecting device for sensing stationary/dynamic status of a car applied to different cars, and FIG. 13 illustrates a sectional view of an assembly of the connecting device shown in FIG. 11.

Referring to FIG. 11, the speed meter cable connecting device, which is operated coupled with the stationary/ dynamic state sensing part 101 of a car shown in FIG. 11, includes a rotating slit plate 908 having a plurality of slits for pressed fit on a middle of a connecting rod 909, a pair of bearings 907 for being inserted into both ends of the connecting rod 909, speed meter cable inner shaft couplings 903a and 904a each for insertion onto a stepped part of the connecting rod 909, a first, and second sleeve joints 905 and 906 each for pressed insertion into a sleeve 910 for surrounding the connecting rod 909 connected as the aboves for protection from outside, a connector 901, which is provided for connecting an output shaft on the transmission gear of the car and the speed meter cable for the speed meter, for coupling with a female thread on the first sleeve joint 905 for fixing the speed meter cable connecting device 900 thereto, thereby the car body 901, the speed meter cable connecting device 900 and the speed meter cable 902 are coupled into a unit by means of a female thread on the speed meter cable 902 coupled to the second sleeve joint 906. The speed meter cable couplings 903a and 904a may be coupled in a locker form or an anchor form depending on car types.

As a sensitivity of the stationary/dynamic status display of the car is dependent on a number of the slits on the rotating slit plate 908, it is preferable to adjust the sensitivity within a range that can best display a speed change of the car while not giving any notion of rejection with respect to its view. A photo interrupter 911 of a predetermined shape is inserted into an opening in the sleeve 910 for the pressed fit of the first, and second sleeve joints 905 and 906 to the sleeve 910, on top of which photo interrupter 911 a PCB 912 is mounted, and the first, and second sleeve joints 905 and 906, the sleeve 910, the photo interrupter 911 and the PCB 912 are fixed by means of washers 914 and bolts 915. By inserting another connector 913b into a connector 913a on one end of the PCB 912, the system shown in FIG. 2 is connected. Thus, the speed meter cable connecting device 900 of the aforementioned system can be assembled as the sectional view shown in FIG. 13.

Referring to FIG. 12, when car type is different, the speed meter couplings 903a and 904a, the rotating slit plate 908 and the first, and second sleeve joints 905 and 906 shown in FIG. 11 may be replaced with the ones shown in FIG. 12 in assembly of the speed meter cable connecting device 900. In this instant, the speed meter cable 902 and the cable inner shaft couplings 903b and 904b may be coupled in a locker form of an anchor form depending on car types. As the rest of system elements are identical to the ones in FIG. 11, explanations on the identical elements will be omitted.

FIG. 14 illustrates an overall layout of a device for displaying stationary/dynamic status of a car in accordance with a preferred embodiment of the present invention applied to the car, wherein it can be seen that the speed meter cable connecting device 900 connected between the connector 901 and the gauge panel 932, and the speed meter cable connecting device 900 and the stationary/dynamic status displaying device mounted at rear of the car connected by various cables. The main switch SW1 for operation of the system is mounted at a predetermined position in a manipulation panel on the gauge panel 934, and a reverse lamp voltage applying terminal connected to the reversing lamps 931 and a connection are connected on circuit basis.

In the meantime, as a sensitivity of the stationary/dynamic status display of the car is dependent on a number of the slits on the rotating slit plate 908, in order to adjust the sensitivity within a range that can best display a speed change of the car while not giving any notion of rejection with respect to its view at all, a relation between rotation of the speed meter cable inner shaft 916 connected to a driven gear 917 on an output shaft of the transmission gear for driving the speed meter in the gauge panel 932 and a speed indication according to country requirements, for which a number of slits in the rotating slit plate 908 is calculated according to the following process.

Relation of r.p.m of flexible shaft (r.p.m. of magnet) to speed indication

| Type | Magnet r.p.m. | Speed indication | Standard |
| --- | --- | --- | --- |
| 4 Wheel (Korea) | 637 | 60 km/h | KS |
| 4 Wheel (U.S.) | 1,000 | 60 mile/h | SAE |
| 4 Wheel (Germany) | 1,000 | 60 km/h | DIN |
| 4 Wheel (France) | 1,000 | 60 km/h | BNA |

According to the above table, revolutions of the speed meter inner shaft 916 is regulated to be 637 r.p.m by KS when the speed meter indicates 60 km/h.

Therefore, a car rotating the speed meter cable inner shaft 916 according to KS has;

$$637/3600 = 0.1769 \text{ revolutions/sec per 1 km/h speed,}$$

A number of slits to pass through the photo interrupter 911 per one second per 1 km/h speed when the number of slits in the rotating slit plate 908 is 25;

$$0.1769 \times 25 = 4.4225,$$

A number of slits to pass through the photo interrupter 911 per 0.25 seconds per 1 km/h speed when the number of slits in the rotating slit plate 908 is 25;

$$0.1769 \times 0.2 = 0.8845, \text{ and}$$

A speed per hour (=x) at which one pulse can be obtained from the pulse generating part 102 in a while of 0.2 seconds is, $$1:0.8845 = x:1, \ x = 1.1306 \text{ km/h.}$$

That is, a car, which rotates the speed meter cable inner shaft 916, has a rotating slit plate 908 of 25 slits attached to the speed meter cable connecting device 900, and runs an equal speed of 1.1306 km/h, will produce a fixed number of 10 pulses in every 0.2 second interval from the pulse generating part 102, continuously.

The relation between a number of revolutions of the speed meter cable inner shaft 916 and speed indication regulated differently from country to country according to the aforementioned calculation permits that one pulse generated in the pulse generating part 102 can represent a running speed (km/h) of the car by adjusting the number of slits in the rotating slit plate 908.

| standard | country | magnet r.p.m | speed indication | number of slits | number of pulses obtainable at a running speed of 1 km/h in 0.2 seconds | running speed (km/h) in which one pluse is generated |
| --- | --- | --- | --- | --- | --- | --- |
| KS | 4W Korea | 637 | 60 km/h | 25 | 0.8845 | 1.1306 |
| SAE | 4W U.S.A. | 1,000 | 60 mile/h | 26 | 0.8975 | 1.1142 |
| DIN | 4W Germany | 1,000 | 60 km/h | 16 | 0.889 | 1.1249 |

If the number of slits in the rotating slit plate 908 is adjusted according to the aforementioned calculation process, a running speed in which one pulse is generated is changed, which change of running speed influences to a sensitivity of the red, and green LED displaying parts 801 and 802 shown in FIG. 9. Therefore, a car rotating the speed meter cable inner shaft coupling 903a pursuant to KS standard to operate the speed meter generates one pulse per 0.2 seconds based on 1.1306 km/h running speed of the car. That is, during the car is running, the one chip microcomputer 100 repetitively measures the running speed in every 0.2 seconds, and senses the running speed of the car from the pulses of the photo interrupter 911 and the pulse generating part 102.

The stationary/dynamic status displaying device of the present invention having the aforementioned system is automatically operated by a system of the one chip microcomputer 100, which is a central controlling system, and the photo interrupter 911 in the stationary/dynamic state sensing part 101 of a car, of which operation will be explained, hereinafter.

When the speed meter cable connecting device 900 shown in FIG. 9 receives a torque from the running of the car through the connector 901 connecting the output shaft of a transmission gear and the speed meter cable for the speed meter, the torque is transmitted to the speed meter cable 902 through the speed meter cable inner shaft coupling 903a and the connecting rod 909 and another speed meter cable inner shaft coupling 904a, to exhibit the running speed on the speed meter on the gauge panel 932 shown in FIG. 14.

As the speed meter cable connecting device 900 operates, the rotating slit plate 908 is rotated, the photo interrupter 911 detects an FE signal corresponding to a number of slits passed through the photo interrupter 911, and the detected FG signal is transmitted to the stationary/dynamic status displaying device of the car by the connectors 913a and 913b (see FIG. 9).

In the meantime, an actual running state of the car body independent to a driver's handling is displayed on the red, and green LED displaying parts 801 and 802 shown in FIG. 9 in any road condition. That is, measured stationary or dynamic status may be displayed on the red, and green LED displaying parts 801 and 802 in 6 states of running classifying them into acceleration, equal speed running and deceleration, and adding stop, slow running, and reversing thereto.

Upon turning on the main switch SW1 on a front face of the gauge panel 932, the LEDs LED1 and LED2 shown in FIG. 1 are turned on, informing operation of the system to the driver.

Figure 10:
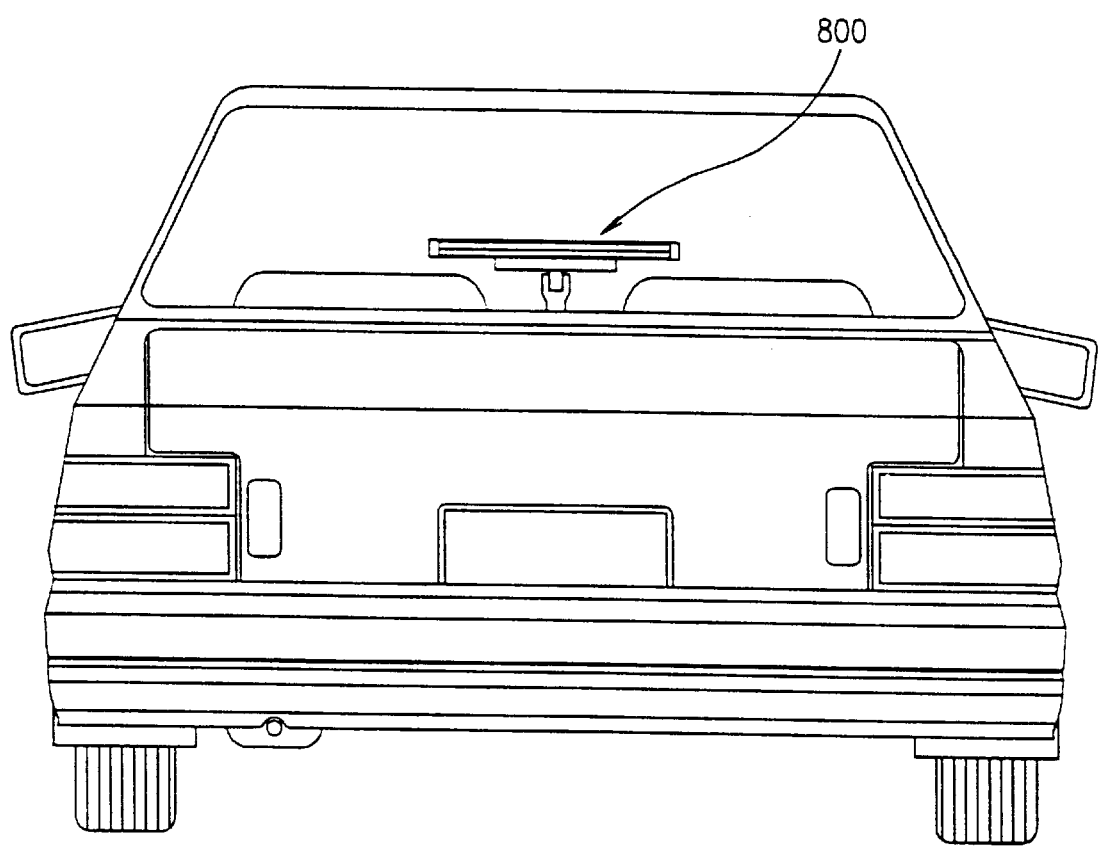
FIG. 10 illustrates an example of an application of a device for displaying stationary/dynamic status of a car in accordance with a preferred embodiment of the present invention to a car.

Referring to FIG. 10, the stationary/dynamic status displaying device 800, disposed at a predetermined part in the rear of the car, measures the aforementioned 6 stationary/dynamic states in every 0.2 seconds continuously to display for a driver in rear of the car in question or other observers outside of the car in a continuous turning on, turning off, flashing of the LEDs according to a software basis automatic control programmed in a built-in ROM in the one chip microcomputer 100, thereby a continuous state of each operation is expressed.

By a software basis control from the one chip microcomputer 100 over one pulse increase in proportion to every 1.1306 km/h running speed increase based both on 637 r.p.m at 60 km/h, which is a rotating speed of the speed meter cable inner shaft 916 according to the KS standard and a slit number of 25 in the rotating slit plate 908, the highest speed in the slow running, a speed at which a change of acceleration or deceleration can be exhibited during running, and a range of the equal speed and the like are obtained according to the following calculations.

* The highest speed in the slow running, when it is based on a 3 pulse generation in the pulse generating part 102, is calculated to be within 1.1306×3+0.5653=3.9571 km/h as a speed just before generation of one pulse is 1.1306×½= 0.5653 km/h considering a distance between the slits formed in the outer circumference of the rotating slit plate 908.

* A change of the running speed (km/h) at which an acceleration or deceleration can be sensed is 0.5653 km/h because a speed represented by one pulse is 1.1306×½= 0.5653 km/h considering a distance between slits formed on the outer circumference of the rotating slit plate 908.

* A range of equal speed is a speed at which a variation within 1.1306 km/h exists, which is a running speed just before generation or reduction of a new pulse considering both that a certain pulse is generated in the pulse generating part 102 from running of the car and a distance between slits formed in the outer circumference of the rotating slit plate 908.

Figure 3:
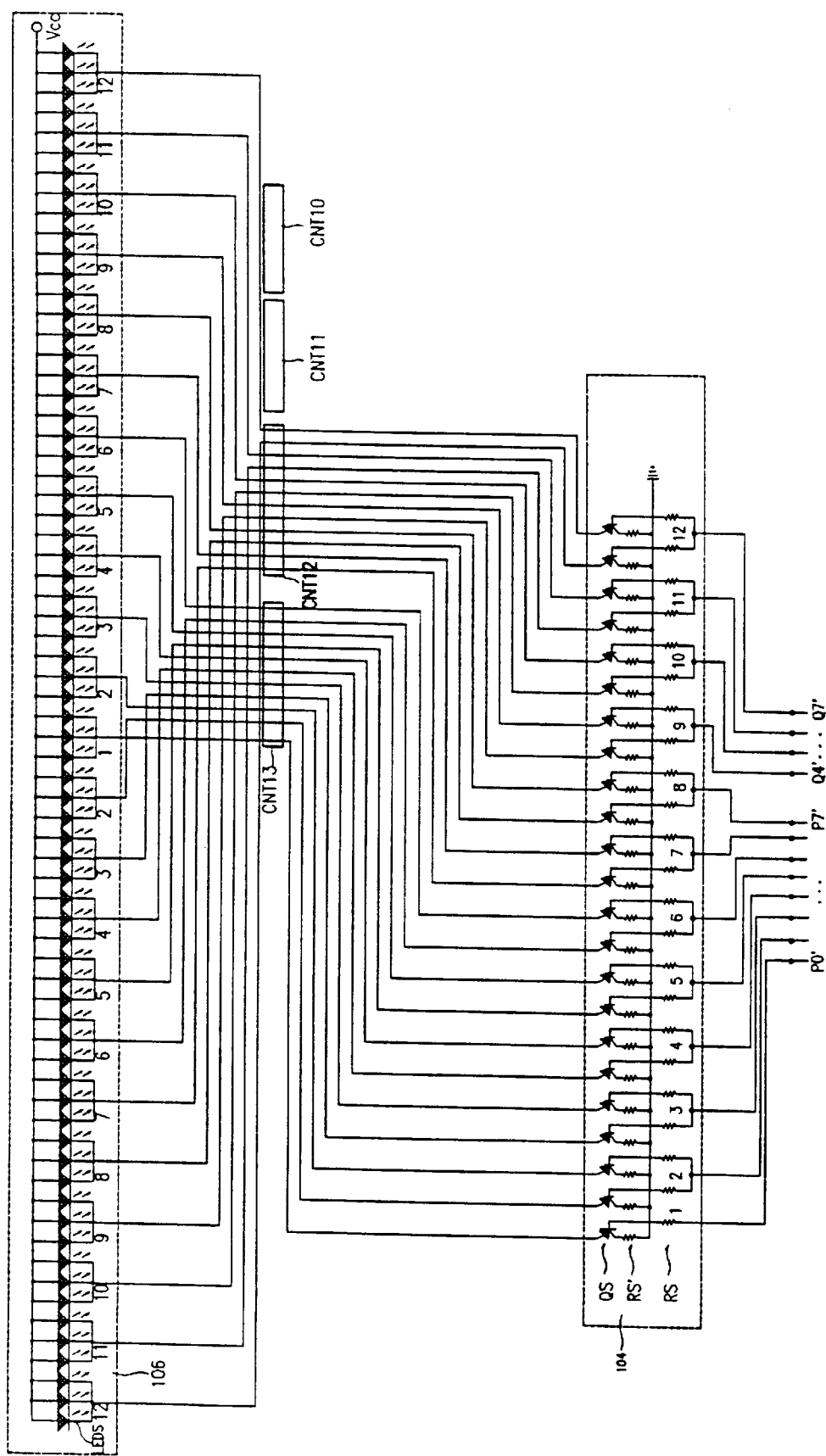
FIG. 3 illustrates a detailed circuit of a green LED operating part and green LED array part shown in FIG. 1.

According to the foregoing calculations (what is explained hereinafter is based on KS standard and a 25 slit number in the rotating slit plate 908), the one chip microcomputer 100 applies the stationary/dynamic statues of the car to the red, and green LED operating parts 103 and 104 through the output ports P0~P7, Q1~Q3, P0'~P7' and Q4'~Q7'. If a low level is applied to the output port P0, the string transistors Qs connected to the first stage of the red LED operating part 103 are driven, to turn on the first stage string LEDs in the middle of the red LED array part 105. Alike, the rest right and left string LEDs in the red LED array part 105 and the green LED array part 106 shown in FIG. 3 are also turned on, and off within a 12 bit (12 stage) range in a shift on manner with a 0.2 second time difference according to rates of the stationary/dynamic states of the car and their durations.

A method for controlling the output ports P0~P7, Q0~Q3, P0'~P7 and Q4'~Q7' by means of the aforementioned one chip microcomputer 100 will be explained in detail in the occasion of explaining a controlling method for displaying stationary/dynamic status of a car explained later, while the stationary/dynamic status which will be displayed by this system will be explained stage by stage, hereinafter.

\* \* \* Stationary state of the Car:

When the car is stopped or waits for a green signal, the entire 12 stages of the string LEDs in the red LED array part 105 shown in FIG. 2 are turned on, and are maintained for the duration of the stationary state even if no brake pedal is stepped on irrespective of any artificial handling of the driver. Therefore, because the entire 69 red string LEDs in the 12 stage red LED array part 105 are turned on through the red LED displaying part 801 shown in FIG. 8, an observer in the rear of the car can have a visual feeling of a stationary state independent from the brake pedal. In this time, the entire green LED displaying part 802 shown in FIG. 8 is turned off.

\*\*\* Slow running state of the Car:

When the car is rolling back at starting on a slope or at a slow speed below 3.9571 km/h which is slower than a walking speed of a general grown up people, the entire 12 stage string LEDs in the red LED array part 105 are turned on, and maintained for the duration of the slow running state. Therefore, because the entire 69 red string LEDs in the 12 stage red LED array part 105 are turned on through the red LED displaying part 801 shown in FIG. 8, an observer in the rear of the car can have a visual feeling that the car is not reached to a regular running speed. In this time, the entire green LED displaying part 802 shown in FIG. 8 is turned off.

\*\*\* Acceleration state of the car:

When the car is accelerated during running, the right and left 11 stages in the green LED array part 106 become a shift on state in which they are turned on starting from the first stage in the middle with 0.2 second time intervals extending to the right and left according to a rate of the acceleration. The time period required for turning on of the entire green LED array part 106 depends on a rate of change per a unit measuring time period (0.2 seconds) and the duration of the acceleration, and, if the acceleration is continuous even after the entire green string LEDs in the 12 stage green LED array part 106 are turned on, the green LED array part 106 maintains the foregoing state for the duration of the acceleration after turning on the entire 12 stages of 69 green LEDs. Therefore, the acceleration state perceived in the rear is a visual expression that facilitates an observer in the rear to perceive the extent of acceleration exactly in a duration of the acceleration through the green LED displaying part 802 shown in FIG. 8. In this instant, the entire red LED displaying part 801 shown in FIG. 8 is turned off.

\*\* Equal speed running state of the car:

The equal speed running is a state when the car is running in a constant speed free from the acceleration and deceleration, in which the car runs in a regular or irregular speed within the 1.1306 km/h at the highest, and the entire string LEDs in the red, and green LED array parts 105 and 106 are turned off and the turned off state is maintained for the duration of the equal speed running. Therefore, the equal speed running state perceived in the rear is that it is the equal speed running state with no speed change as the entire string LEDs in the red and green LED array parts 105 and 106 displayed in the red and green LED displaying parts 801 and 802 shown in FIG. 8 are turned off.

\* \* Deceleration state of the car:

When the car is decelerated during running, the right and left 11 stages in the red LED array part 105 become a shift on state in which they are turned on starting from the first stage in the middle with 0.2 second time intervals extending to the right and left according to a rate of the deceleration. The time period required for turning on of the entire red LED array part 105 depends on a rate of change per a unit measuring time period (0.2 seconds) and the duration of the deceleration, and, if the deceleration is continuous even after the entire red string LEDs in the 12 stage red LED array part 105 are turned on, the red LED array part 105 maintains the foregoing state for the duration of the deceleration after turning on the entire 12 stages of 69 red LEDs. In this instant, the entire green LED displaying part 802 shown in FIG. 8 is turned off

** Reversing state of the car:

When a transmission lever is put to a reversing position, the entire 12 stages of the string LEDs in the red LED array part 105 shown in FIG. 2 are turned on, and start to flash after a while. Therefore, because the entire 69 red string LEDs of 12 stages flashes through the red LED displaying part 801 shown in FIG. 8, the observer in the rear feels danger in vision. In this instant, the entire green LED displaying part 802 shown in FIG. 8 is turned off. The flashing of the red string LEDs in the red LED displaying part 801 shown in FIG. 8 displayed in the reversing state is canceled when the transmission lever is put to a neutral or forward position.

A controlling method for displaying stationary/dynamic status of a car with respect to the aforementioned system control operation in accordance with a preferred embodiment of the present invention will be explained with reference to the attached drawings FIGS. 4~7.

Figure 4:
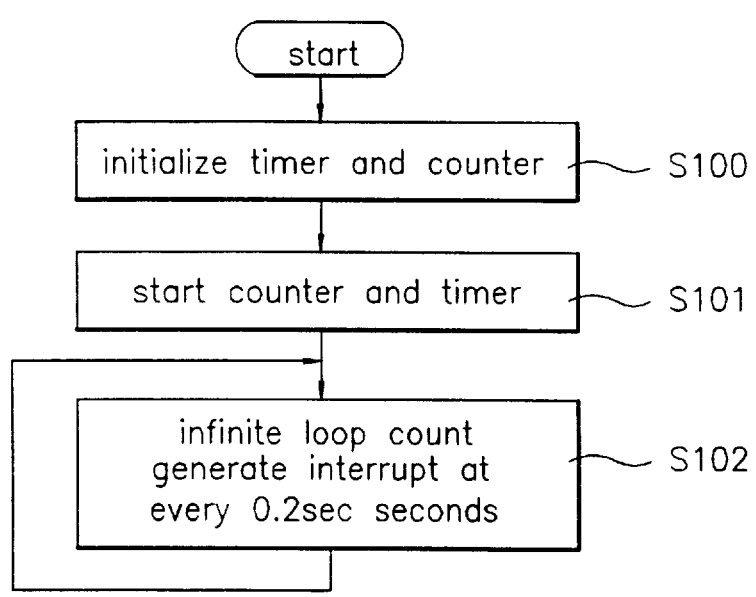
FIG. 4 illustrates a flow chart showing an outline of operation steps of a controlling method for displaying stationary/dynamic status of a car in accordance with a preferred embodiment of the present invention.

FIG. 4 illustrates a flow chart showing an outline of the operation steps of the controlling method for displaying stationary/dynamic status of a car in accordance with a preferred embodiment of the present invention.

Upon turning the main switch SW1 in FIG. 1 on, a predetermined power is supplied to the constant voltage supplying device 110, and the power on reset circuit part 109 initializes the one chip microcomputer 100 (S100). Then, the timer and counter start time counting and pulse counting respectively (S101), and repeats an infinite loop counting to generate an interrupt in every 0.2 seconds until the system operation comes to an end (S102).

Figure 5:
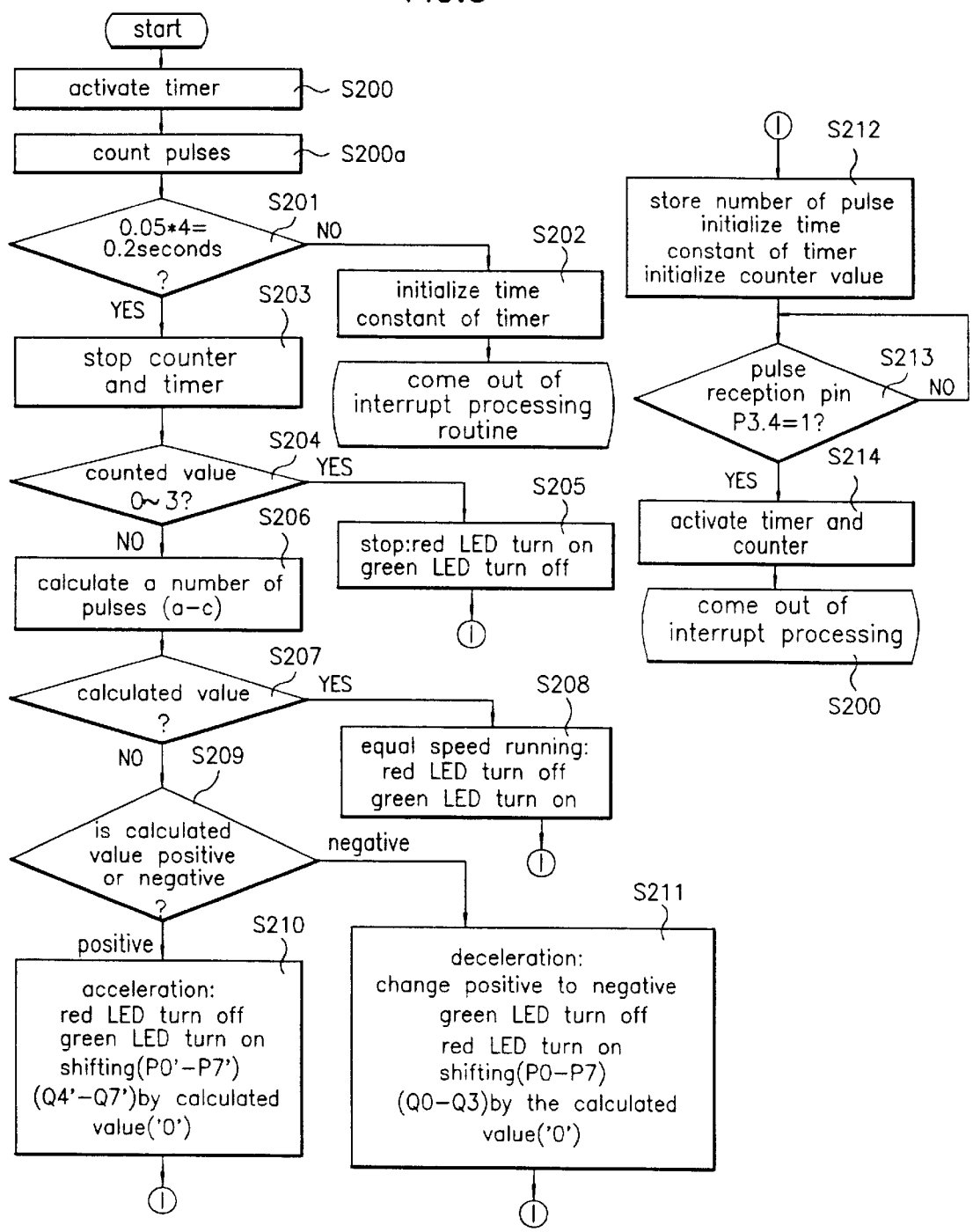
FIG. 5 illustrates a flow chart showing detailed operation steps of a controlling method for displaying stationary/dynamic status of a car in accordance with a preferred embodiment of the present invention.

FIG. 5 illustrates a flow chart showing detailed operation steps of the controlling method for displaying stationary/dynamic status of a car shown in FIG. 4.

Referring to FIG. 5, when the main switch SW1 in the main switch part 111 is turned on, the one chip microcomputer, initialized by the power on reset circuit part 109, stops the count and timer (S203) if one or more than one pulse is received within 0.2 seconds (S201) from the pulse generating part 102 according to the starting of the timer in the system (S200), pulse counting (S200a) and running of the car, and initializes a time constant of the timer (S202) if the pulse is not received within 0.2 seconds and comes out of the interrupt processing routine.

If the counted value is not 0~3 after stopping of the counting (S203) in the aforementioned step, a calculated value for a step (S207) is calculated according to the following calculation method in a pulse number calculating step (S206). The running speed of the car is counted as pulses by a built-in timer and produced as a number of pulses in a counted value determining step (S204). A calculating method is already included in the pulse number calculating step (S206) for processing minute changes of running speed of the car on software basis and displaying an exact running status of the car by means of the red, and green LED displaying parts 801 and 802.

In the controlling method for displaying stationary/dynamic status of a car, the microcomputer 100 in the running car converts each of the running speeds in stop, slow running, acceleration equal speed running and deceleration states during the car running into a number of pulses counted by the built-in counter in 0.2 seconds basis set as an operation period of the built-in timer, stores in an internal memory in a pulse number storing step (S212), and comes out of the interrupt processing routine.

Therefore, in the method for calculating the calculated value (S207) in the pulse number calculating step (S206), a number of pulses "a" produced as "no" in the present counted value confirmation step (S204), a number of pulses "b" stored in the internal memory in the pulse number storing step (S212) when coming out of the interrupt processing routine right before producing the "a" pulse number, and a number of pulses "c" stored in the internal memory in the pulse number storing step (S212) when coming out of the interrupt processing routine right before producing the "b" pulse number, are subjected to an operation in the pulse number calculating step (S206), to produce the pulse number calculated value (S207).

A calculating equation for the operation is (a−c)=the calculated value (S207). That is, in the method for controlling the device for displaying stationary/dynamic status of a car, the microcomputer 100 in the running car repeatedly subjects the present counted value "a", and "b" and "c" stored in the internal memory to an operation in every 0.2 seconds in the calculated value determining step (S206), to produce the calculated value (S207). If it is explained in detail, the one chip microcomputer 100 is initialized by turning the main switch part 111 on, and the initialized one chip microcomputer 100 starts execution of the program stored in the built-in ROM, to apply a logic '0' to the 12 output pins on the output ports P0~P7 and Q0~Q3, resulting to ground the pins. In consequence to the ground of the pins, the string transistors Qs in the red LED operating part 103 in FIG. 2 amplify currents, and the amplified currents turn the entire 69 red string LEDs corresponding to the red LED array part 105 to indicate the stationary state.

In case when there is no change in the number of pulses (in case there is no pulse detected due to stop of the car during running) generated by the stationary/dynamic state sensing part 101, the one chip microcomputer 100 under execution of the program turns the entire red string LEDS in the red LED array part 105, to display the stationary state of the car during the time of signal waiting or stoppage even if no brake pedal is stepped on.

Figure 7:
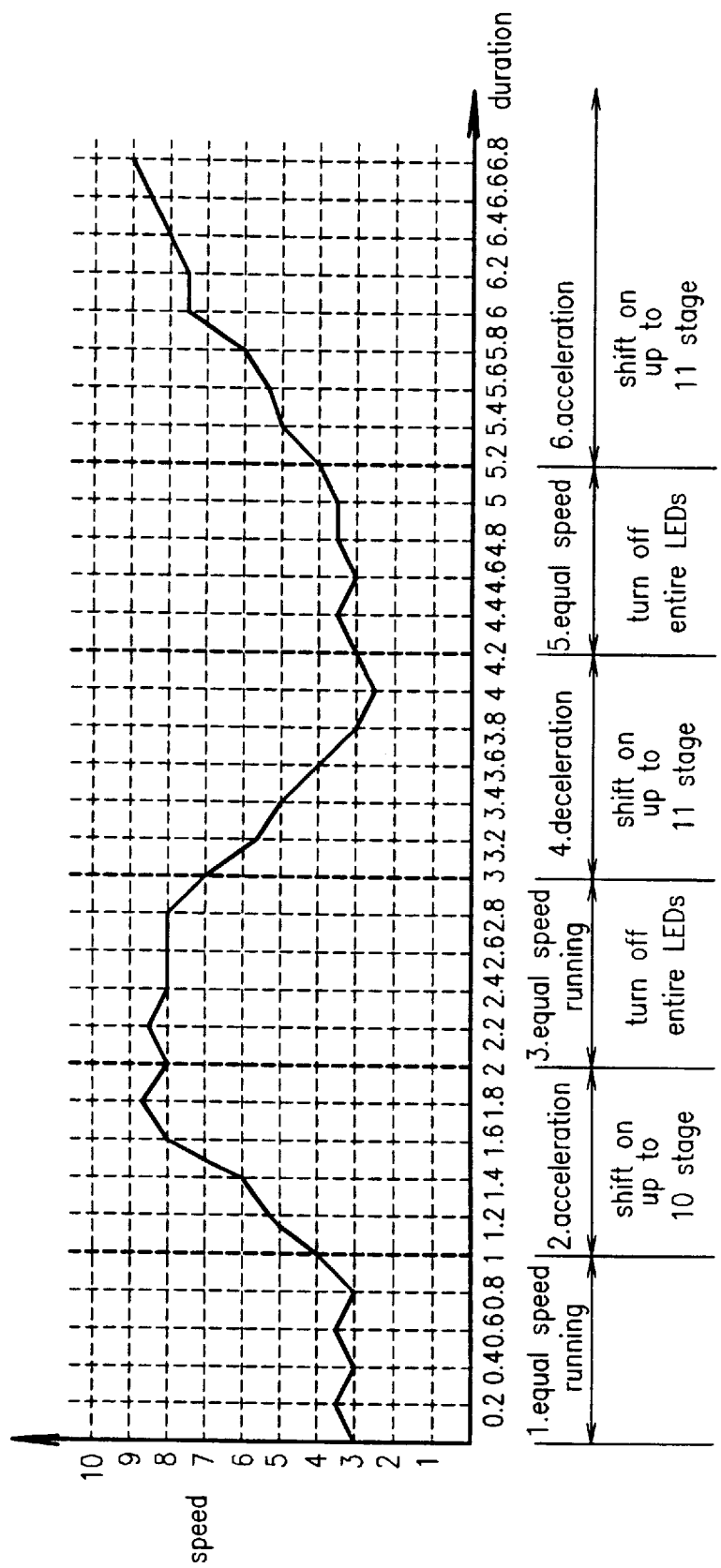
FIG. 7 illustrates a graph showing a relation of the running speed changes of a car according to the flow chart shown in FIG. 5 and a display device, schematically.

FIG. 7 schematically illustrates a graph showing a relation of the running speed changes of a car according to the flow chart shown in FIG. 5 and the display device; a graph schematically showing actual states of turning on of the red, and green LED displaying parts 801 and 802 in the stationary/dynamic displaying device 800 of a car shown in FIG. 9. The operations of equal speed running, acceleration and deceleration will be explained in succession with reference to FIG. 7.

In the calculated value determining step (S207) in which the one chip microcomputer 100 determines a number of pulses generated through the stationary/dynamic state sensing part 101, understanding that the car is running in an equal speed if the calculated pulse value is 0, the one chip microcomputer 100 turns off the entire red string LEDs as well as the green string LEDs (S208), if the calculated speed is not 0, the one chip microcomputer 100 jumps to a step (S209) for determining a polarity of the calculated pulse value. In this case, the polarity represents detected value of pulses per a unit duration shown in FIG. 7 (for example, if there is one pulse increase per a unit duration of 0.2 seconds as the car is accelerated, the value is +1, and if the detected pulses are reduced as the car is decelerated, the value is reduced to −1 and −2). If it is explained in more detail, it represents operations of understanding the change of pulses from the stationary/dynamic state sensing part 101 of the car at the one chip microcomputer 100, and turning off the entire red, and green string LEDs and maintaining the turned off state at the pulse value understood by the microcomputer 100, i.e., in the equal speed section (a section in which identical pulses are repeated). The relation between a range of speed which is displayed as the equal speed running and the detected time is as shown in FIG. 7. In this instant, the equal speed display is produced in case the calculated value (S207) of the pulses per a unit duration (0.2 seconds) detected by the stationary/dynamic stats sensing part 101 of the car after acceleration or deceleration irrespective of the car speed is understood as the equal speed running. If the change of speed happens within a speed of 1.1306 km/h or if a constant speed is maintained, the speed in understood as the equal speed.

After the equal speed running step (S208), the counted number of pulses are stored in the internal memory of the microcomputer 100, the time constant of the timer and a counter value are initialized (S212), and the pulses generated in the stationary/dynamic state sensing part 101 and applied to the one chip microcomputer 100 are determined of being at a high level (S213). If the high level is identified, the timer and counter are activated (S214), and the microcomputer 100 comes out of the interrupt processing routine. If the calculated value is found positive in the step (S209) for determining a polarity of the calculated value, understanding it as an acceleration, the red string LEDs are turned off, and, on the same time, the green string LEDs are turned on with the 12 output terminals on the output ports P0'~P7' and Q4'~Q7' set to a low level (0) as much as the calculated value (S210). If the number of pulses sensed and measured in the stationary/dynamic state sensing part 101 of the car and the pulse generating part 102 respectively increases, such a acceleration step is processed branched to a predetermined processing routine by an interrupt (a change of number of pulses per unit time) during execution of the program by the one chip microcomputer 100. That is, if the number of pulses generated per a unit time of 0.2 seconds increases continuously as the car is accelerated, the one chip microcomputer 100 applies a logic '0' of an acceleration state with time differences of 0.2 seconds to the 12 output ports P0'~P7' and Q4'~Q7', to shift on the output ports. The application of logic '0' grounds each of the output ports, amplifies currents from the string transistors Qs in the green LED operating part 104, and the amplified currents turn on the high luminance green string LEDs in the green LED array part 106. In this turning on operation, a number of turned on LEDs are increased in the right and left direction depending on rate and duration of the acceleration starting from the first stage in the middle of the green LED array part 106. This display operation is possible because the one chip microcomputer 100 understands that it is an acceleration state at a point in FIG. 7 at which the calculated number of pulses measured at the one chip microcomputer 100 is positive.

After the acceleration step (S210), the counted number of pulses is stored in the internal memory in the microcomputer 100, the time constant of the timer and the counter value are initialized (S212), the input to the pulse input pin IN on the one chip microcomputer 100 is determined of being at a high level (S213) to activate the timer and counter, and the one chip microcomputer 100 comes out of the interrupt processing routine.

If the calculated value is determined negative in the calculated value determining step (S209), understanding that it is a deceleration state, the green string LEDs are turned off, and, on the same time, the red string LEDs are turned on (S211) putting the output terminals on the output ports P0~P7 and Q0~Q3 to a low level (0) as much as the calculated value. If the number of pulses sensed and measured in the stationary/dynamnic state sensing part 101 of the car and the pulse generating part 102 respectively decreases, the one chip microcomputer 100, understanding the decrease of the number of pulses per a unit time during execution of the program from the program, stops the execution of the program executed at the present time and branches out to a predetermined processing routine. That is, if the number of pulses generated per a unit time of 0.2 seconds decreases as the car slows down, the one chip microcomputer 100 applies a logic '0' of a deceleration state with time differences of 0.2 seconds to the 12 output ports P0~P7 and Q0~Q3, to shift on the output ports. The application of logic '0' grounds each of the output ports, amplifies currents from the string transistors Qs in the red LED operating part 103, and the amplified currents turn on the high luminance red string LEDs in the red LED array part 105. In this turning on operation, a number of turned on LEDs are increased in the right and left direction depending on rate and duration of the deceleration starting from the first stage in the middle of the red LED array part 105. This display operation is possible because the one chip microcomputer 100 understands that it is a deceleration state at a point in FIG. 7 at which the calculated number of pulses measured at the one chip microcomputer 100 is negative.

After the deceleration step (S211), the counted number of pulses is stored in the internal memory in the microprocessor 100, the time constant of the timer and the counter value are initialized (S212), the input to the pulse input pin IN on the one chip microcomputer 100 is determined of being at a high level (S213) to activate the timer and the counter (S214), and the one chip microcomputer 100 comes out of the interrupt processing routine.

Figure 6:
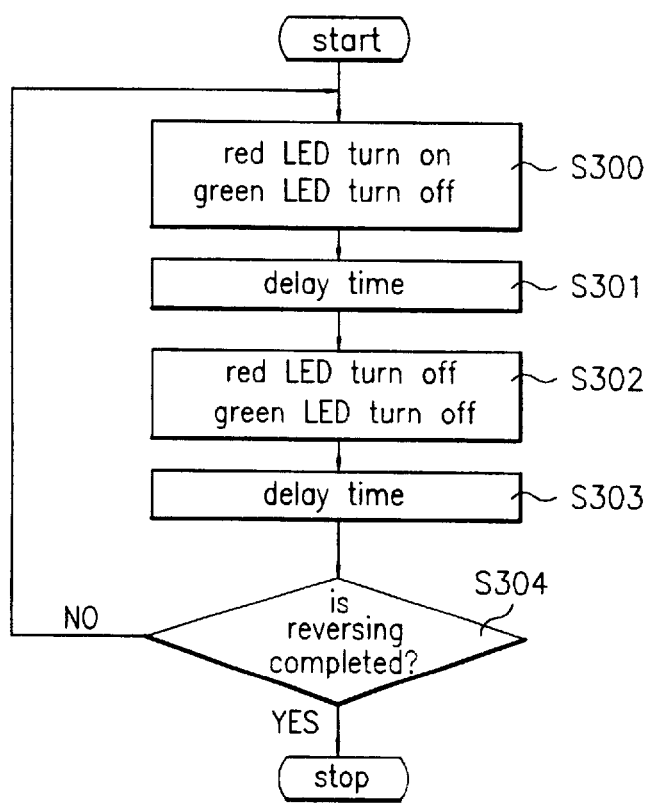
FIG. 6 illustrates a flow chart showing reversing operation steps of the controlling method for displaying stationary/dynamic status of a car in accordance with a preferred embodiment of the present invention.

FIG. 6 illustrates a flow chart showing reversing operation steps of the controlling method for displaying stationary/dynamic status of a car in accordance with a preferred embodiment of the present invention.

Referring to FIG. 6, upon putting the transmission lever to a reversing position in a controlling mode according to the stationary/dynamic status display of a car of the present invention, the dc voltage connected to the reversing lamps operates the relay in the reversing relay switching part 108 to generate an interrupt signal. Namely, as shown in FIG. 14, on the same time with the turning on of the reversing lamps 931 following the reversing, the reversing relay switching part 108 is activated and an interrupt processing routine for the reversing is executed. Following application of an interrupt signal from the reversing relay switching part 108 to the one chip microcomputer 100, all the signals from the stationary/dynamic sensing part 101 of a car are disregarded in software basis (during the reversing interrupt is in application) and the reversing is indicated on the red LED displaying part 801 shown in FIG. 8, of which operation is as follows. After turning on the entire 69 red string LEDs, the entire green string LEDs are turned off (S300). This step (S300) is maintained in software basis (S301). After this step (S301), the entire red, and green string LEDs are turned off (S302). This step (S302) is maintained in software basis (S303). After all the foregoing steps (S300 S303) (flashing the red LED array part 105 once), finishing of the reversing is determined (S304), to continue the foregoing steps (S300~S303) repeatedly until finish of the reversing.

As has been explained, the device for displaying stationary/dynamic status of a car, including a car stationary/dynamic state sensing part for detecting a change of speed of a predetermined time period sensed by a rotating slit plate mounted on a speed meter cable connecting device and a photo interrupter, a pulse generating part for converting an analog signal from the state sensing part into digital pulses and applying to an one chip microcomputer, a reverse relay switching part connected to a positive terminal on a reversing lamp for applying an interrupt signal to the one chip microcomputer when a transmission lever is put to a reversing position, the one chip microcomputer for reading in a driving data programmed in a built-in ROM in response to a signal from the pulse generating part and applying driving pulses to a relevant output port, a power on reset circuit part for applying a reset signal to a reset terminal for initializing the one chip microcomputer, an oscillating part for providing a system clock signal to the one chip microcomputer, a red LED operating part and a green LED operating part for turning on respective LEDs in a red LED array part and a green LED array part in response to the one chip microcomputer operation output, the red LED array part and the green LED array part for being turned on by the operating output from the operating parts, a main switch part for supplying main power to a constant voltage supplying device according to a switching operation, the constant voltage supplying device for supplying a constant voltage to a system according to a main switch operation, and a connecting part for connecting the power supplying part which supplies a car battery power to the main switch part and a reverse lamp voltage reception terminal for operating the reverse relay switching part; and the method for controlling the device has an advantage that all the car stationary/dynamic states can be displayed in stages classifying the states into stop, slow running, acceleration, equal speed running, deceleration and reversing.

And, the present invention has an advantage that changes in speed or state, such as reversing of a car can be automatically displayed exactly within a short time of 0.2 seconds without any artificial manipulation by means of the display device.

And, by providing the aforementioned device at rear of a car and displaying stationary/dynamic states of the car in a wave-like form to the rear, the present invention can assure safety in running of the car, and can elevate the elegance of the car without giving any notion of refusal.

And, the device for displaying stationary/dynamic status of a car of the present invention has advantages that it can be used widely because its required voltage is 32V at the maximum, and its low current requirement (maximum 12V, 2A) has no significant influence to the battery charge of the car.

And, the application of the high luminance LEDs to the string LEDs in the red, and green LED array parts of the present invention allows a long life and can be distinguishable with easy even in daytime.

And, the device for displaying stationary/dynamic status of a car of the present invention has advantages that it can be mounted on a car with easy without affecting the functions or structure of the car, and, by general application of the device to cars, can prevent accidents from lack of precautions which can happen during running of cars in advance.

As it is possible to display stationary/dynamic status of a running car by means software basis sensing operation of the one chip microcomputer including the ROM, RAM, CPU, counter and timer, it is apparent that the device for displaying stationary/dynamic status of a car and the method for controlling the same of the present invention can be modified in various forms and varied without limited to the embodiments of the present invention described in the specification without departing from the subject matter of the present invention.

It will be apparent to those skilled in the art that various modifications and variations can be made in the device and controlling method for displaying stationary/dynamic status of a car of the present invention without departing from the spirit or scope of the invention. Thus, it is intended that the present invention cover the modifications and variations of this invention provided they come within the scope of the appended claims and their equivalents.

What is claimed is:

1. A device for displaying stationary/dynamic status of a car comprising:

a car stationary/dynamic state sensing part for detecting a change of speed for a period of time sensed by a rotating slit plate mounted on a speed meter cable connecting device and a photo interrupter, such that as the speed meter cable connecting device operates, the rotating slit plate is rotated and the photo interrupter detects an analog signal corresponding to a number of slits passed through the photo interrupter;

a pulse generating part for converting the analog signal from the state sensing part into digital pulses;

a reverse switching part connected to a positive terminal on a reversing lamp for switching an interrupt signal when a transmission lever is put to a reversing position;

a microcomputer for reading in a driving data programmed in a ROM in response to pulses from the pulse generating part and applying driving pulses to a relevant output terminal;

a power on reset circuit part for applying a reset signal to a reset terminal for initializing the microcomputer;

an oscillating part for providing a system clock signal to the microcomputer;

a car stationary/dynamic state displaying part having a red LED operating part and a green LED operating part for turning on relevant LEDs in a red LED array part and a green LED array part in response to the microcomputer operation output;

the red LED array part and the green LED array part being turned on by the operating output from the operating parts;

a constant voltage supplying device for supplying a constant voltage according to a switching operation; and, a connecting part for connecting a power supplying part which supplies car battery power to a main switch part and a reverse lamp voltage reception terminal for operating the reverse switching part wherein running states of the car can be displayed in stationary/dynamic states of stop, slow running, acceleration, equal speed running, deceleration and reversing.

2. A device as claimed in claim 1, wherein the pulse generating part includes an inverter for converting an analog signal detected in the car stationary/dynamic state sensing part to digital pulses.

3. A device as claimed in claim 1, wherein the speed meter cable connecting device which is the car stationary/dynamic state sensing device, is fixed to a connector for connecting a transmission gear output shaft and a speed meter cable of the speed meter by means of a speed meter cable inner shaft coupling having an identical shape with a speed meter cable inner shaft and a sleeve joint having a female thread identical to a thread in the speed meter cable, and, at a rear of the speed meter cable connecting device, fixed by connecting the speed meter cable inner shaft and the speed meter cable female thread to the speed meter cable inner shaft coupling having identical shape to a recess in a transmission gear output shaft gear part and the sleeve joint having a male thread having an identical shape to the connector for connecting a transmission gear output shaft and a speed meter cable on a speed meter, whereby a driving force on the output shaft of the transmission gear is transmitted to the speed meter on the gauge panel and an identical number of revolutions is obtained.

4. A device as claimed in claim 1, wherein the speed meter cable connecting device of the car stationary/dynamic state sensing part includes a rotating slit plate with a plurality of slits on a center portion of a connecting rod therein, and both ends thereof locker or anchor shaped for connecting with a car body.

5. A device as claimed in claim 1, wherein a sensitivity of a state of slow running, acceleration, equal speed running and deceleration displayed on the car stationary/dynamic status displaying part can be adjusted by adjusting a number of the slits in the rotating slit plate.

6. A device as claimed in claim 1, wherein, when the transmission lever is put to a reversing position, the reverse switching part makes the microcomputer to understand the reversing by operating the switching part by applying a dc current for the turned on reversing lamp thereto and applying the interrupt signal generated according to the operation of the switching part to the microcomputer.

7. A device as claimed in claim 1, wherein each of the red LED operating part and the green LED operating part includes string resistors connected to an output terminal on the microcomputer, string transistors each connected to a terminal on one of the string resistors and another set of string resistors.

8. A device as claimed in claim 1, wherein each of the red and green LED array parts includes a plurality of LEDs arranged in a row of a first stage to a last stage, thereby the entire LEDs are turned on starting from the first stage and extends the stages to the right and left directions depending on a rate of speed change and duration of a state.

9. A device as claimed in claim 1, wherein a sensitivity of a state of slow running, acceleration, deceleration and equal speed running displayed on the car stationary/dynamic state displaying part can be adjusted by measuring pulses in one operation cycle generated through the pulse generating part in the car stationary/dynamic state device by setting one time operation cycle of the microcomputer.

10. A device as claimed in claim 9, wherein the displaying part of the stationary/dynamic status displaying device is provided so that red color is used for expression of stop, deceleration, slow running and reversing, and green, or blue color is used for expression of acceleration, and the array parts include LEDs or lamps.

11. A controlling method for displaying stationary/dynamic status of a car comprising the steps of:

(1) initializing an microcomputer for initializing a timer and a counter at the same time upon turning on a switch in a main switch part, and repeating measurement of pulses generated in a pulse generating part of a car stationary/dynamic state sensing part by means of the timer for stopping the timer and counter if the pulses are sensed within a reference duration and initializing a time constant of the timer and initializing the counter if the pulses are not sensed within the reference duration;

(2) turning on an entire red LED display part and turning off an entire green LED displaying part if a counted value after the stop of the counter in the (1) step is understood to be stop or slow running, and subtracting a counted value stored in a memory from the present counted value which represents a speed of the car at the present time if the counted value exceeds a value that represents stop or slow running, to calculate a number of pulses at the present time;

(3) if the microcomputer understands that the car is at an equal speed running from the pulses calculated in the (2) step, turning both the entire red LEDs and the entire green LEDs off, and jumping to a step for determining acceleration/deceleration from the pulse calculated value if the pulse calculated value indicates a speed change;

(4) turning the entire red LED off and, at the same time, turning the green LED on according to a rate of acceleration if the calculated value is understood to represent an acceleration in the (3) step, and turning the entire green LED off and, at the same time, turning the red LED on according to a rate of the deceleration if the calculated value is understood to be deceleration; and, (5) repeating the (1)-(4) steps for turning the luminance LEDs in the red, and green LED displaying parts, wherein each of the red and green LED display parts includes a plurality of LEDs arranged in a row of a first stage to a last stage, by shifting the turned-on LEDs with time lag starting from a first stage in the middle and extending the stages to the right and left, according to rate and duration of each state of stop, slow running, acceleration, equal speed running, deceleration.

12. A method as claimed in claim 11, wherein a state of display of a car running state displayed on a displaying device of the red and green LED array parts by currents from red and green LED operating parts amplified under the control of the microcomputer, is flashing which is repetition of turning on/off of the entire LEDs in the red LED displaying part with predetermined time differences at reversing of the car, turning on the entire LEDs in the red LED displaying part and maintaining the turning on state for the duration of the stop at stop of the car, turning on the entire LEDs in the red LED displaying part and maintaining the turning on state until a speed of the slow running of the car is exceeded at slow running of the car, simultaneous turning on of one stage or many stages of the green LED displaying part depending on a rate of an acceleration and shifting on adding one or more stages of the LEDs to a prior turned on stage according to a duration of the acceleration to add up the turned on stages at acceleration of the car, simultaneous turning on of one stage or many stages of the red LED displaying part depending on a rate of a deceleration and shifting on adding one or more stages of the LEDs to a prior turned on stage according to a duration of the deceleration to the turn the LEDs on up to the last stage at deceleration of the car, and turning-off the entire LEDs in the red and green LED displaying parts to show no speed change at equal speed running of the car.

13. A method as claimed in claim 11, wherein the (2) step includes the steps of, storing the numbers of pulses counted at stop and slow running into the memory and initializing the time constant of the timer and the counter value, and upon detecting a change of voltage at a pulse reception terminal on the microcomputer, activating the timer and counter, and counting pulses generated in the pulse generating part in the counter.

14. A method as claimed in claim 11, wherein the (3) step includes the steps of, storing the number of pulses counted at equal speed running into the memory and initializing the time constant of the timer and the counter value, and upon detection of a voltage change at a pulse reception terminal on the microcomputer, activating the timer and counter, and counting pulses generated in the pulse generating part in the counter.

15. A method as claimed in claim 13, wherein the (4) step includes the steps of, storing the number of pulses counted at acceleration into the memory and initializing the time constant of the timer and the counter value, and upon detection of a voltage change at a pulse reception terminal on the microcomputer, activating the timer and counter, and counting pulses generated in the pulse generating part in the counter.

16. A method as claimed in claim 11, wherein the (4) step includes the steps of, storing the number of pulses counted at deceleration into the memory and initializing the time constant of the timer and the counter value, and upon detection of a voltage change at a pulse reception terminal on the microcomputer, activating the timer and counter, and counting pulses generated in the pulse generating part in the counter.

17. A method as claimed in claim 11, further comprising the steps of:

(6) upon reception of an interrupt signal generated by a reverse relay switching part connected to a reverse lamp at the microcomputer, storing the (4) step into the memory, and flashing the red LED displaying part once by maintaining a state for a predetermined time, in which the entire red LEDs are turned on and the entire green LEDs turned off, and maintaining a state for a predetermined time, in which the entire red LEDs are turned off and the entire green LEDs are turned off, and (7) after conducting the (6) step, determining finish of the reversing and repeating the (6) step until finish of the reversing.

* * * * *